(12) United States Patent
Chen et al.

(10) Patent No.: US 11,493,127 B2
(45) Date of Patent: Nov. 8, 2022

(54) SYSTEM AND METHOD FOR REDUCING GEAR LASH RELATED TORQUE DISTURBANCES

(71) Applicant: Ford Global Technologies, LLC, Dearborn, MI (US)

(72) Inventors: Weitian Chen, Windsor (CA); Matthew John Shelton, Grosse Ile, MI (US); Zhengyu Dai, Canton, MI (US); Pinzhi Liu, Dearborn, MI (US); Jose Velazquez Alcantar, Canton, MI (US); Joseph Jay Torres, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 278 days.

(21) Appl. No.: 17/007,248

(22) Filed: Aug. 31, 2020

(65) Prior Publication Data
US 2022/0065346 A1    Mar. 3, 2022

(51) Int. Cl.
| | |
|---|---|
| *F16H 61/00* | (2006.01) |
| *F16H 61/04* | (2006.01) |
| *B60K 1/02* | (2006.01) |
| *B60K 17/356* | (2006.01) |
| *F16H 61/684* | (2006.01) |
| *B60K 1/00* | (2006.01) |

(52) U.S. Cl.
CPC .......... *F16H 61/0403* (2013.01); *B60K 1/02* (2013.01); *B60K 17/356* (2013.01);
(Continued)

(58) Field of Classification Search
CPC ............... F16H 61/0403; F16H 61/684; F16H 2061/0075; F16H 2061/0422; F16H 2708/22; F16H 2061/0425; F16H 2061/0433; F16H 2061/047; F16H 2061/0474; B60K 1/02; B60K 17/356; B60K 2001/001; B60K 17/354;
(Continued)

(56) References Cited

U.S. PATENT DOCUMENTS

| 5,398,565 A | 3/1995 | Brock |
| 6,101,439 A | 8/2000 | Cutting et al. |

(Continued)

FOREIGN PATENT DOCUMENTS

| EP | 0139473 A2 | 5/1985 |
| EP | 0187117 A2 | 7/1986 |

(Continued)

OTHER PUBLICATIONS

Chen, W. et al., "System and Method for Changing Gear Ranges of a Four Wheel Drvie Vehicle," U.S. Appl. No. 16/547,418, filed Aug. 21, 2019, 38 pages.

(Continued)

*Primary Examiner* — Justin Holmes
(74) *Attorney, Agent, or Firm* — Vincent Mastrogiacomo; McCoy Russell LLP

(57) ABSTRACT

Methods and system are described for changing a driveline gear range from a lower gear range to a higher gear range. The driveline may include two electric machines and four clutches in a four wheel drive configuration. The methods and systems permit a driveline to change from a lower gear range to a higher gear range in a way that may reduce torque disturbances that may result from gear lash.

20 Claims, 5 Drawing Sheets

(52) U.S. Cl.
CPC ...... *F16H 61/684* (2013.01); *B60K 2001/001* (2013.01); *B60Y 2200/91* (2013.01); *F16H 2061/0075* (2013.01); *F16H 2061/0422* (2013.01); *F16H 2708/22* (2013.01)

(58) Field of Classification Search
CPC ...... B60K 23/08; B60K 1/00; B60Y 2200/91; B60Y 2400/82; Y02T 10/72; B60L 15/2054; B60L 2240/423
See application file for complete search history.

(56) References Cited

U.S. PATENT DOCUMENTS

| | | |
|---|---|---|
| 6,845,683 B2 | 1/2005 | Tarui et al. |
| 7,331,899 B2 | 2/2008 | Ortmann et al. |
| 2011/0039650 A1* | 2/2011 | Rosemeier .............. B60L 50/61 475/149 |
| 2016/0039405 A1* | 2/2016 | Terayama ................ B60K 6/52 903/906 |
| 2021/0053549 A1* | 2/2021 | Chen .................... B60W 10/08 |

FOREIGN PATENT DOCUMENTS

| | | |
|---|---|---|
| JP | S58110328 A | 6/1983 |
| KR | 100514893 B1 | 9/2005 |

OTHER PUBLICATIONS

Chen, W. et al., "System and Method for Changing Gear Range of a Four Wheel Drvie Vehicle," U.S. Appl. No. 16/708,200, filed Dec. 9, 2019, 34 pages.

* cited by examiner

SYSTEM AND METHOD FOR REDUCING GEAR LASH RELATED TORQUE DISTURBANCES

FIELD

The present description relates generally to methods and systems for shifting gear ranges of axles of a four wheel drive electric vehicle. The electric vehicle may include electric machines that may provide power to a front axle and a rear axle.

BACKGROUND/SUMMARY

A vehicle axle may be configured with an electric machine, gearbox, and final drive. The gearbox and final drive include gears that mesh together to provide mechanical advantage that is leveraged to propel a vehicle. The gears within the gearbox and final drive may remain in contact with other gears when positive or negative torque is delivered through the gears continuously. However, if torque transfer through the gears reverses from positive torque to negative torque or vice-versa, the gear teeth may separate and then mesh at a different area of the gear teeth so that the gear teeth impact. The impact between the gear teeth may be felt and/or heard by occupants of a vehicle. For example, vehicle occupants may observe a clunking sound and a momentary change in vehicle and/or driveline speed. The separation between gears may result from a clearance or lash between the gears that allows torque transfer through the gears to reverse while motion of the gears may continue. Thus, the gear lash may be desirable, but it may also factor into potential driveline torque disturbances.

The gearbox may be shifted into the high range gear from a low range gear via completely stopping the vehicle and manually selecting the high gear range when the vehicle is completely stopped. Driveline torque disturbances that are related to gear lash may be avoided in this way. Nevertheless, human drivers may not desire to stop the vehicle to shift from the lower gear range to the higher axle gear range. Further, torque disturbances due to gear lash may be particularly noticeable if it were possible for the gearbox to be shifted from the low gear range to the high gear range when a vehicle is moving due to the large ratio change between the low gear range and the high gear range.

The inventors herein have recognized the above-mentioned issues and have developed a method for operating a vehicle, comprising: shifting a first axle from a low gear range to a high gear range while meeting driver demand torque via a second axle, the shifting including ramping down torque of an electric machine of the first axle to a threshold positive torque, disengaging the low gear range, adjusting torque of the electric machine of the first axle to a negative torque in a predetermined amount of time, the torque of the electric machine of the first axle adjusting a high gear range clutch's slip speed of the first axle, engaging a synchronizer in response to the high gear range clutch's slip being within a threshold of zero slip, closing the high gear range clutch, and increasing torque of the electric machine after closing the high gear range clutch.

By decreasing output of the first electric machine of an axle to a threshold positive torque before reducing output of the first electric machine to a negative torque during a gearshift, it may be possible reduce gear teeth impact that may occur during a gear shift. In addition, by reducing torque of the first electric machine to a negative torque, it may be possible to control slip of a high gear range clutch so that clutch wear may be reduced and so that torque transfer through the high gear range may be smooth.

The present description may provide several advantages. In particular, the approach allows a driveline to switch from a lower gear range to a higher gear range without having to stop the vehicle. In addition, the approach may reduce driveline torque disturbances that may be related to gear lash. Further, the approach may extend useful life of gear clutches.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
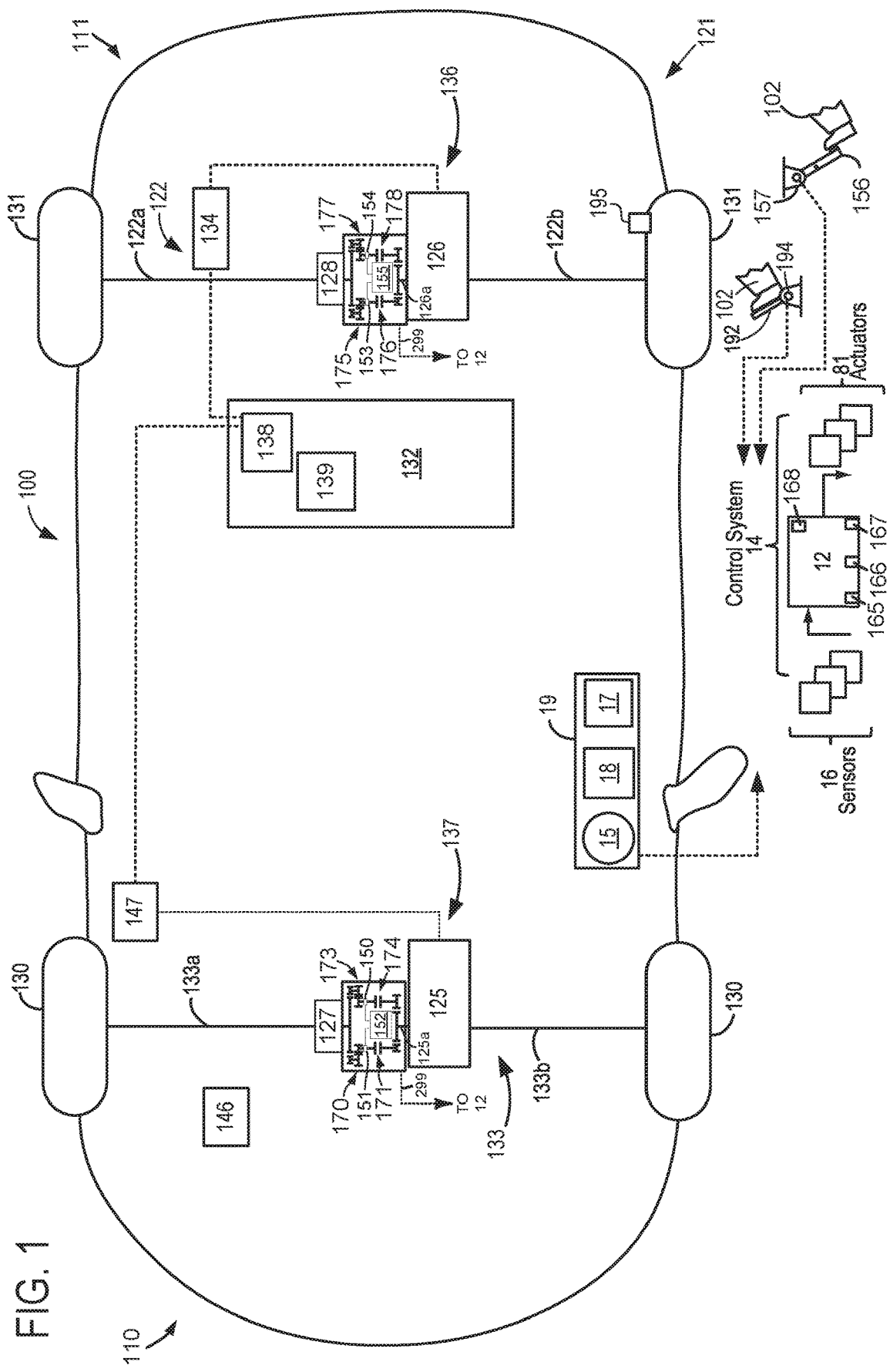
FIG. 1 is a schematic diagram of a vehicle driveline is shown.
Figure 2:
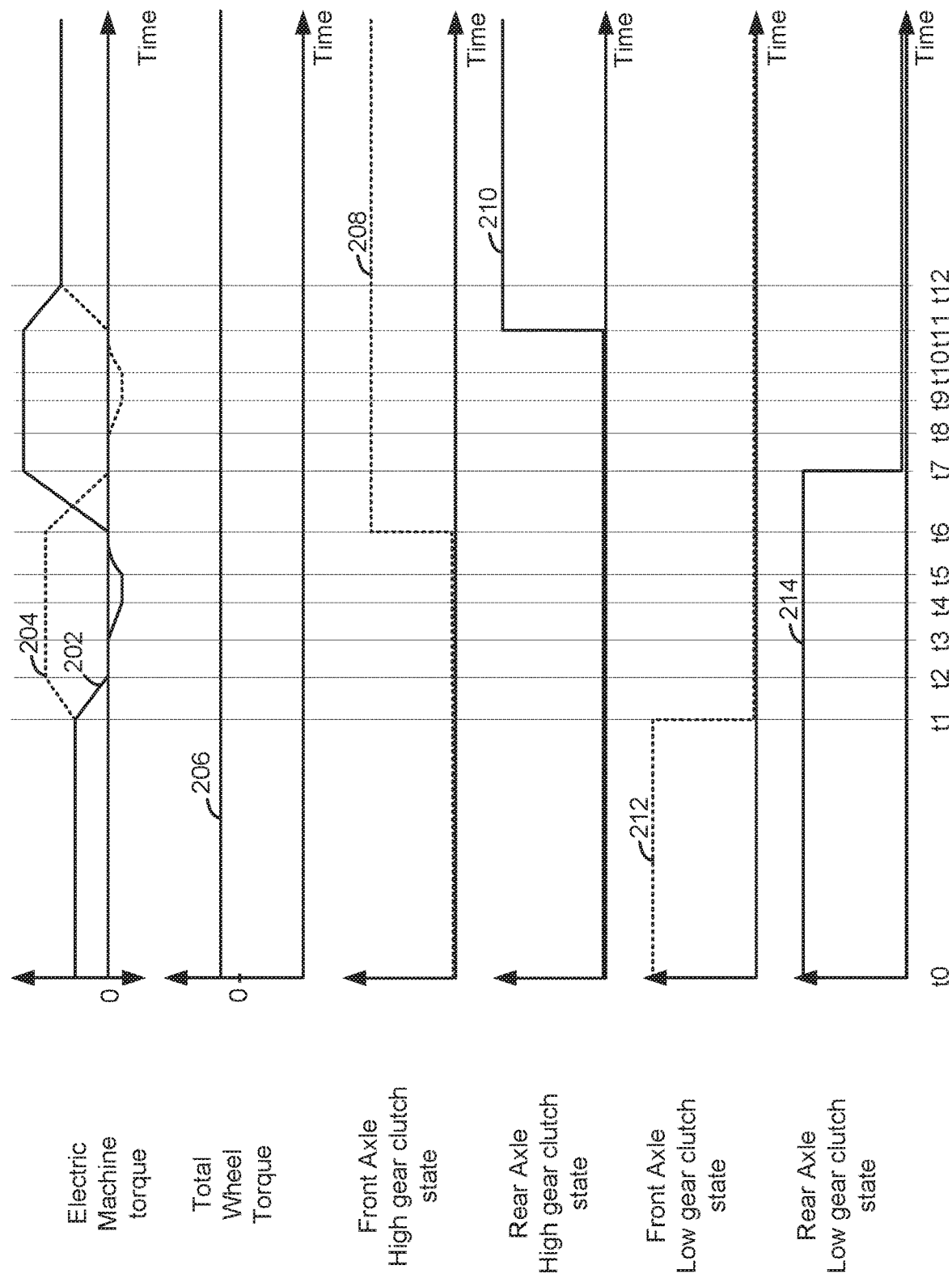
FIGS. 2 and 3 show two different driveline operating sequences.
Figure 3:
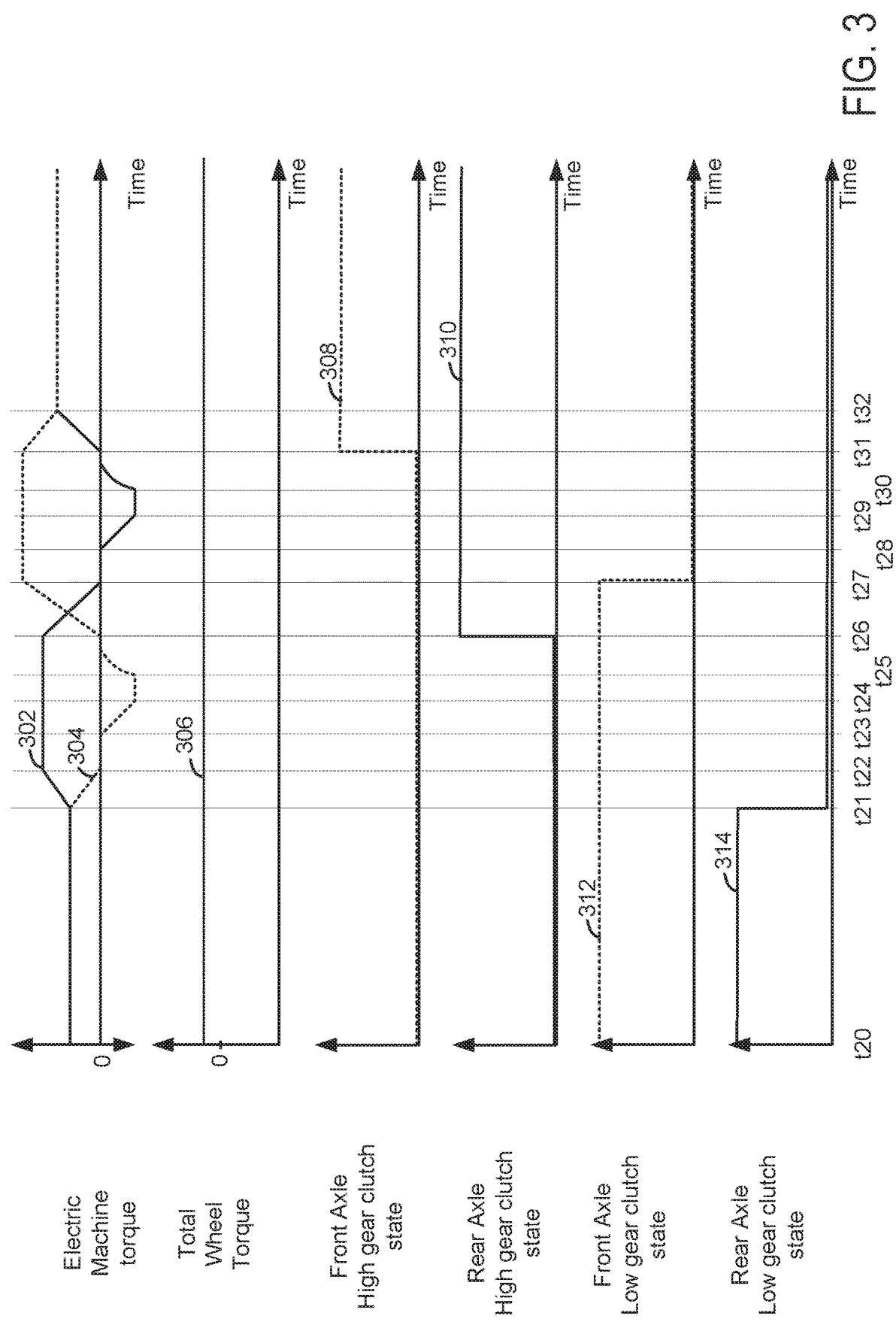

The following description relates to systems and methods for operating a driveline or powertrain of a four wheel drive vehicle. The four wheel drive vehicle may be configured as an electric vehicle, or alternatively, the vehicle may be configured as a hybrid vehicle. An example vehicle and driveline or powertrain is shown in FIG. 1. FIGS. 2 and 3 show example driveline operating sequences according to the method of FIGS. 4 and 5. A method for operating a four wheel drive vehicle and shifting a driveline from a lower gear range to a higher gear range is shown. The method of FIGS. 4 and 5 permits the driveline to be shifted from the lower gear range to the higher gear range while the vehicle is moving. The method of FIGS. 4 and 5 may reduce driveline torque disturbances that are related to gear lash in an axle.

FIG. 1 illustrates an example vehicle propulsion system 100 for vehicle 121. A front portion of vehicle 121 is indicated at 110 and a rear portion of vehicle 121 is indicated at 111. Vehicle propulsion system 100 includes at two propulsion sources including front electric machine 125 and rear electric machine 126. Electric machines 125 and 126 may consume or generate electrical power depending on their operating mode. Throughout the description of FIG. 1, mechanical connections between various components are illustrated as solid lines, whereas electrical connections between various components are illustrated as dashed lines.

Vehicle propulsion system 100 has a front axle 133 and a rear axle 122. In some examples, rear axle may comprise two half shafts, for example first half shaft 122*a*, and second half shaft 122*b*. Likewise, front axle 133 may comprise a first half shaft 133*a* and a second half shaft 133*b*. Vehicle propulsion system 100 further has front wheels 130 and rear wheels 131. In this example, front wheels 130 may be selectively driven via an electric machine 125. Rear wheels 131 may be driven via an electric machine 126.

The rear axle 122 is coupled to electric machine 126. Rear drive unit 136 may transfer power from electric machine 126 to axle 122 resulting in rotation of drive wheels 131. Rear drive unit 136 may include a low gear set 175 and a high gear 177 that are coupled to electric machine 126 via output shaft 126a of rear electric machine 126. Low gear 175 may be engaged via fully closing low gear clutch 176 and engaging synchronizer 153 via shift mechanism 155 (e.g., shift forks and an actuator). High gear 177 may be engaged via fully closing high gear clutch 178 and engaging synchronizer 154 via shift mechanism 155. High gear clutch 177 and low gear clutch 178 may be opened and closed via commands received by rear drive unit 136 over CAN 299. Alternatively, high gear clutch 177 and low gear clutch 178 may be opened and closed via digital outputs or pulse widths provided via control system 14. Rear drive unit 136 may include final drive or differential 128 so that torque may be provided to axle 122a and to axle 122b. In some examples, an electrically controlled differential clutch (not shown) may be included in rear drive unit 136.

The front axle 133 is coupled to electric machine 125. Front drive unit 137 may transfer power from electric machine 125 to axle 133 resulting in rotation of drive wheels 130. Front drive unit 137 may include a low gear set 170 and a high gear 173 that are coupled to electric machine 125 via output shaft 125a of front electric machine 125. Low gear 170 may be engaged via fully closing low gear clutch 171 and engaging synchronizer 151 via shifting mechanism 152 (e.g., shift forks and actuator). High gear 173 may be engaged via fully closing high gear clutch 174 and engaging synchronizer 150 via shifting mechanism 152. High gear clutch 174 and low gear clutch 171 may be opened and closed via commands received by front drive unit 137 over CAN 299. Alternatively, high gear clutch 174 and low gear clutch 171 may be opened and closed via digital outputs or pulse widths provided via control system 14. Front drive unit 137 may include differential 127 so that torque may be provided to axle 133a and to axle 133b. In some examples, an electrically controlled differential clutch (not shown) may be included in rear drive unit 137.

Electric machines 125 and 126 may receive electrical power from onboard electrical energy storage device 132. Furthermore, electric machines 125 and 126 may provide a generator function to convert the vehicle's kinetic energy into electrical energy, where the electrical energy may be stored at electric energy storage device 132 for later use by the electric machine 125 and/or electric machine 126. A first inverter system controller (ISC1) 134 may convert alternating current generated by rear electric machine 126 to direct current for storage at the electric energy storage device 132 and vice versa. A second inverter system controller (ISC2) 147 may convert alternating current generated by front electric machine 125 to direct current for storage at the electric energy storage device 132 and vice-versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the electric machine), including cabin heating and air conditioning, engine starting, headlights, cabin audio and video systems, etc.

Control system 14 may communicate with one or more of electric machine 125, electric machine 126, energy storage device 132, etc. Control system 14 may receive sensory feedback information from one or more of electric machine 125, electric machine 126, energy storage device 132, etc. Further, control system 14 may send control signals to one or more of electric machine 125, electric machine 126, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an electric machine electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) (not shown), wheel speed sensor(s) 195, etc. In some examples, sensors associated with electric machine 125, electric machine 126, wheel speed sensor 195, etc., may communicate information to controller 12, regarding various states of electric machine operation. Controller 12 includes non-transitory (e.g., read only memory) 165, random access memory 166, digital inputs/outputs 168, and a microcontroller 167.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 125 and electric machine 126) based on an operator input. Various examples of the operator ignition interface 15 may include interfaces that require a physical apparatus, such as an active key, that may be inserted into the operator interface 15 to start the electric machines 125 and 126 and to turn on the vehicle, or may be removed to shut down the electric machines 125 and 126 to turn off the vehicle. Other examples may include a passive key that is communicatively coupled to the operator interface 15. The passive key may be configured as an electronic key fob or a smart key that does not have to be inserted or removed from the interface 15 to operate the vehicle electric machines 125 and 126. Rather, the passive key may need to be located inside or proximate to the vehicle (e.g., within a threshold distance of the vehicle). Still other examples may additionally or optionally use a start/stop button that is manually pressed by the operator to start or shut down the electric machines 125 and 126 to turn the vehicle on or off. In other examples, a remote electric machine start may be initiated remote computing device (not shown), for example a cellular telephone, or smartphone-based system where a user's cellular telephone sends data to a server and the server communicates with the vehicle controller 12 to start the engine.

The system of FIG. 1 provides for a vehicle system, comprising: a first electric machine coupled to a front axle, the front axle including a first gearbox including a first gear and a second gear; a second electric machine coupled to a rear axle, the rear axle including a second gearbox including a third gear and a fourth gear; a controller including executable instructions stored in non-transitory memory to decrease output of the first electric machine to a negative torque and increase output of the second electric machine in response to a request to switch a driveline from a lower gear range to a higher gear range. The system further comprises additional instructions to operate the first electric machine in a speed control mode during a shift from the lower gear range to the higher gear range. The system further comprises additional instructions to reduce slip of a clutch while operating the first electric machine in the speed control mode. The system includes where the first electric machine is operated in the speed control mode in response to output of the first electric machine reaching the negative torque. The system further comprises additional instructions to provide a driver demand torque via the second electric machine. The system further comprises operating the second electric machine in a torque control mode.

Figure 4:
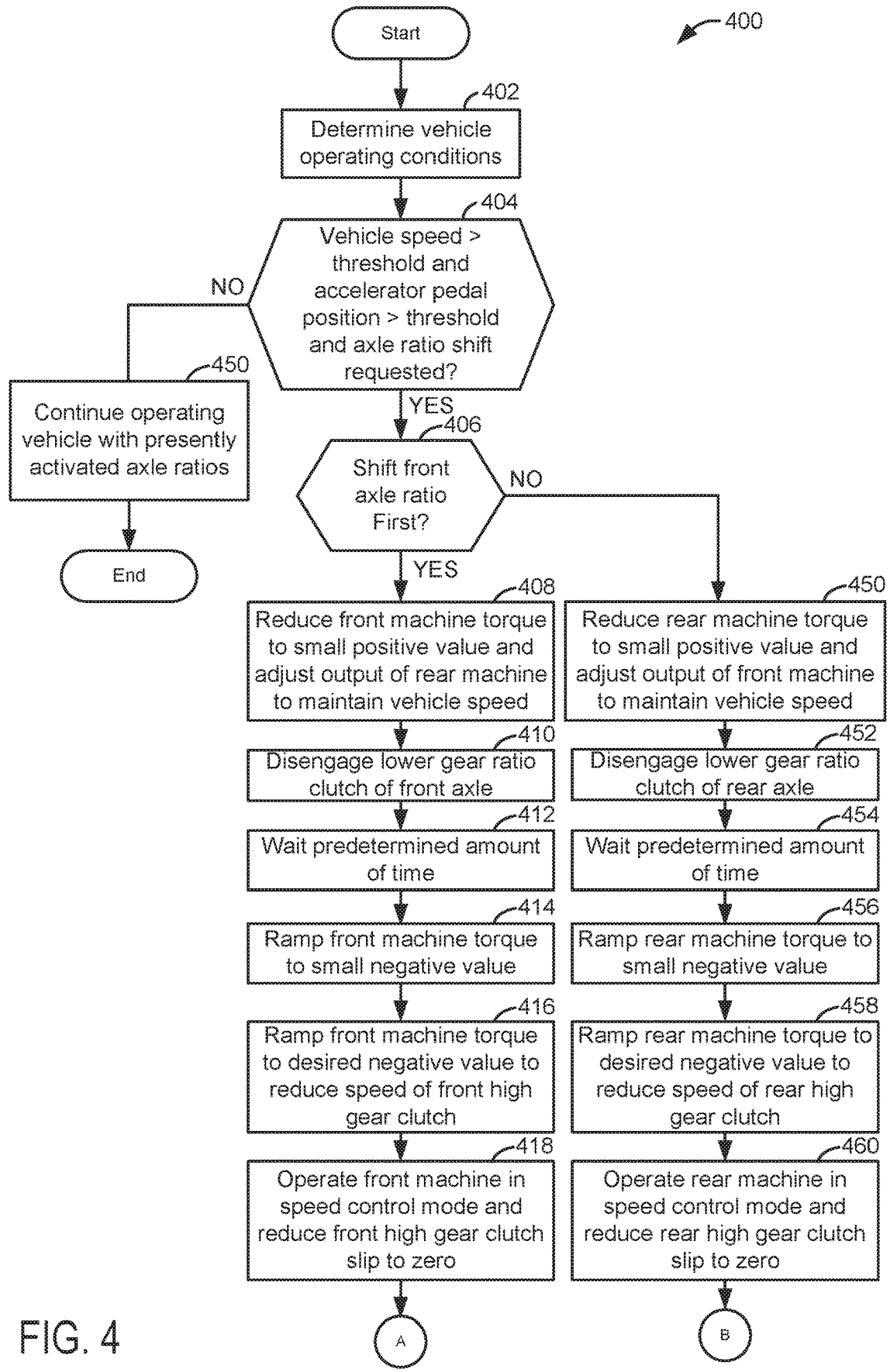
FIGS. 4 and 5 show an example of a method for operating a driveline of a four wheel drive vehicle.
Figure 5:
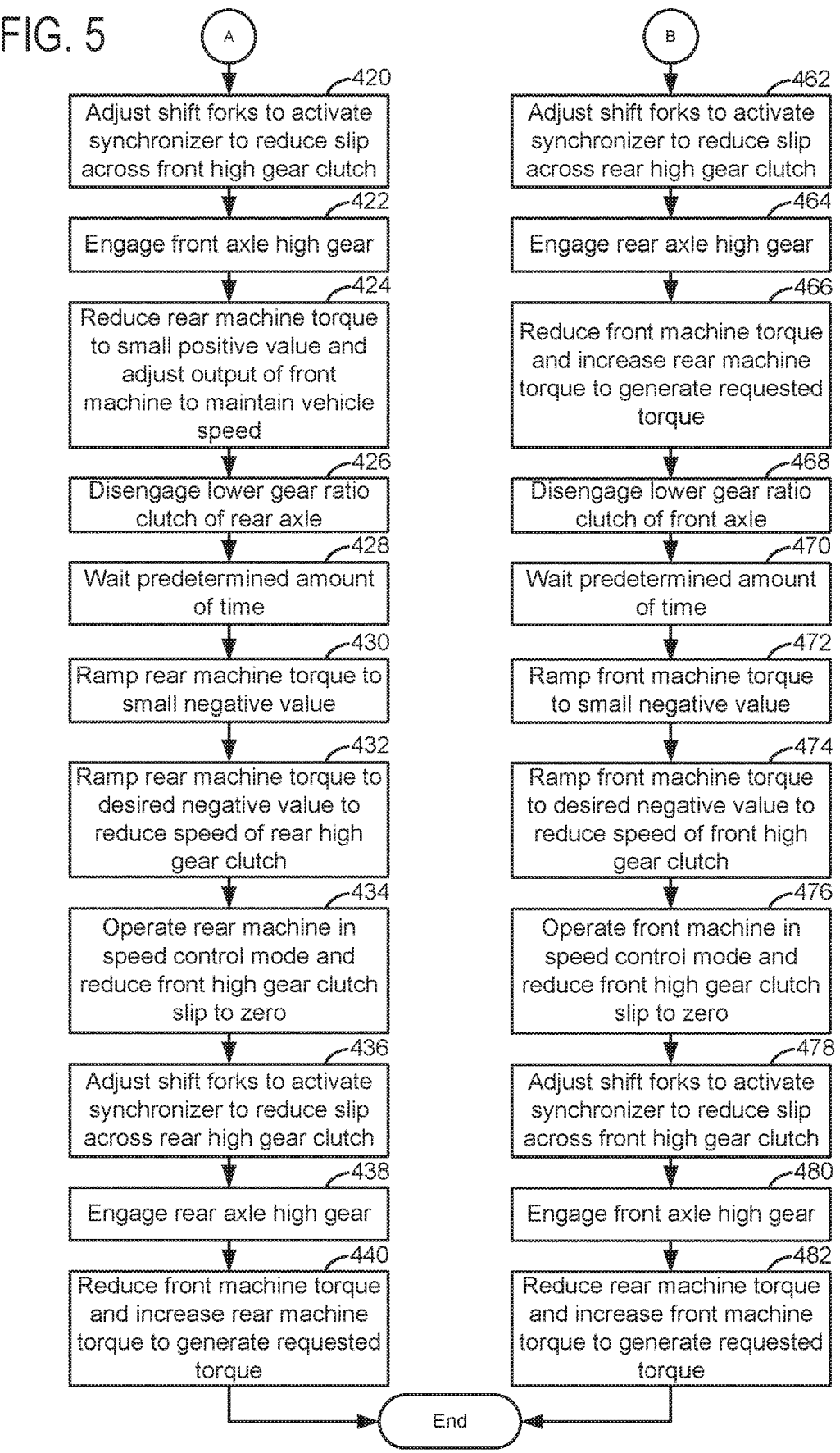

Referring now to FIG. 2, a prophetic vehicle operating sequence according to the method of FIGS. 4 and 5 is shown. The vehicle operating sequence shown in FIG. 2 may be provided via the method of FIGS. 4 and 5 in cooperation with the system shown in FIG. 1. The plots shown in FIG. 2 occur at the same time and are aligned in time. The vertical lines at t0-t11 represent times of interest during the sequence. The sequence of FIG. 2 takes place when an accelerator pedal is applied by a driver such that the wheel torque request is non-zero and while the vehicle is moving on a road.

The first plot from the top of FIG. 2 is a plot of electric machine torque versus time. The vertical axis represents electric machine torque and the electric machine torque increases in the direction of the vertical axis arrow. The horizontal axis represents time and time increases from the left side of the figure to the right side of the figure. Trace 204 represents the rear axle electric machine torque. Trace 202 represents the front axle electric machine torque.

The second plot from the top of FIG. 2 is a plot of total wheel torque (e.g., sum of front wheel torque and rear wheel torque) versus time. The vertical axis represents the total wheel torque at the vehicle's wheels and the magnitude of the total wheel torque increases in the direction of the vertical axis arrow. The horizontal axis represents time and time increases from the left side of the figure to the right side of the figure. Line 206 represents the total wheel torque (e.g., the torque of all four wheels).

The third plot from the top of FIG. 2 is a plot of front axle high gear clutch operating state versus time. The vertical axis represents front axle high gear clutch operating state and the front axle high gear clutch operating state is fully closed when a trace 208 is at a higher level near the vertical axis arrow. The horizontal axis represents time and time increases from the left side of the figure to the right side of the figure. Trace 208 represents the front axle high gear clutch state. The front axle high gear is engaged when the front axle high gear clutch is closed. The front axle high gear is disengaged when the front axle high gear clutch is open.

The fourth plot from the top of FIG. 2 is a plot of rear axle high gear clutch operating state versus time. The vertical axis represents rear axle high gear clutch operating state and the rear axle high gear clutch operating state is fully closed when a trace 210 is at a higher level near the vertical axis arrow. The horizontal axis represents time and time increases from the left side of the figure to the right side of the figure. Trace 210 represents the rear axle high gear clutch state. The rear axle high gear is engaged when the rear axle high gear clutch is closed. The rear axle high gear is disengaged when the rear axle high gear clutch is open.

The fifth plot from the top of FIG. 2 is a plot of front axle low gear clutch operating state versus time. The vertical axis represents front axle low gear clutch operating state and the front axle low gear clutch operating state is fully closed when a trace 212 is at a higher level near the vertical axis arrow. The horizontal axis represents time and time increases from the left side of the figure to the right side of the figure. Trace 212 represents the front axle low gear clutch state. The front axle low gear is engaged when the front axle low gear clutch is closed. The front axle low gear is disengaged when the front axle low gear clutch is open.

The sixth plot from the top of FIG. 2 is a plot of rear axle low gear clutch operating state versus time. The vertical axis represents rear axle low gear clutch operating state and the rear axle low gear clutch operating state is fully closed when a trace 214 is at a higher level near the vertical axis arrow. The horizontal axis represents time and time increases from the left side of the figure to the right side of the figure. Trace 214 represents the rear axle low gear clutch state. The rear axle low gear is engaged when the rear axle low gear clutch is closed. The rear axle low gear is disengaged when the rear axle low gear clutch is open.

At time t0, the front electric machine torque and the rear electric machine torque are positive, non-zero, and based on a non-zero or applied accelerator pedal position (not shown). The total wheel torque is at a middle level and the front axle and rear axle low gear clutches are fully closed. The front axle and rear axle high gear clutches are fully open. Thus, the driveline is in a low gear range suitable for driving the vehicle at lower speeds.

At time t1, a request to change the driveline from the lower gear range to a higher gear range occurs (not shown). The sequence shown begins by changing the gear ratio of the front axle followed by changing the gear ratio of the rear axle. The output torque of the front electric machine begins to be reduced at a predetermined rate (e.g., ramped down) and the output of the rear electric machine begins to be increased at a predetermined rate. This allows vehicle speed to be maintained and reduces the possibility of a generating a "torque hole" (e.g., a reduction in driveline torque that may reduce vehicle speed and may be noticeable to vehicle occupants) in driveline torque output. Thus, vehicle drivability may be improved and the front axle may be shifted to high gear on the fly. The total wheel torque remains constant while the torque of the front and rear electric machines is changing. The front axle low gear clutch begins to open and the rear axle low gear clutch is fully closed. Thus, the low gear of the front axle begins to be disengaged and the low gear of the rear axle remains engaged so that driver demand torque may be delivered via the rear axle. The front axle high gear clutch and the rear axle high gear clutch are fully open so that electric machine torque is not transferred through the front axle higher gear and the rear axle higher gear.

At time t2, the output torque of the front axle electric machine is reduced to within a predetermined threshold of zero (e.g., 2 Newton-meters (Nm)) and the front axle low gear clutch is fully opened. The rear axle electric machine torque output has leveled off and the total wheel torque has remained constant. The front axle high gear clutch remains fully open and the rear axle high gear clutch remains fully open. The rear axle low gear clutch remains fully closed to allow the rear axle electric machine to solely propel the vehicle.

Between time t2 and time t3, the front axle electric machine torque is not adjusted to allow gear teeth to mesh without causing a large impact between the gears, including gears in the final drive. The total wheel torque is unchanged and the front axle high gear clutch remains open. The rear axle high gear clutch is also open and the front axle low gear clutch is open. The rear axle low gear clutch is fully closed.

At time t3, the front axle electric machine is commanded to provide a negative torque (e.g., resisting driveline rotation) and the magnitude of the front axle electric machine negative torque is ramped or increased at a predetermined rate to a desired negative value. The desired negative value allows the front axle electric machine to control slip (e.g., a speed difference between a first side or an input side of a clutch and a second side or output side of the clutch) across the front axle high gear clutch. The total wheel torque is unchanged and the front axle high gear clutch is open. The rear axle high gear clutch is open and the front axle low gear clutch is open. The rear axle low gear clutch is closed.

At time t4, the front axle electric machine torque is held at a predetermined negative torque to allow the front axle high gear clutch slip speed to be reduced so that rotational speed of front axle electric machine may match the rotational speed of the high gear, thereby reducing slip speed of the front axle high gear clutch. The torque output of the rear axle electric machine remains at its previous level and the total wheel torque is unchanged. The front axle high gear clutch remains open and the rear axle high gear clutch remains open. The front axle low gear clutch remains open and the rear axle low gear clutch remains closed. Between time t0 and time t4, the front and rear axle electric machines are operated in torque control mode (e.g., the electric machine torque is adjusted to follow a torque while electric machine speed is permitted to vary) (not shown).

At time t5, the front axle electric machine is switched from operating in torque control mode to operating in speed control mode (e.g., the electric machine torque is adjusted so that speed of the electric machine follows a speed while electric machine torque is permitted to vary) (not shown). In particular, the front axle electric machine is commanded to reduce a slip speed of the high gear clutch to zero via a proportional/integral/derivative controller. For example, torque of the front axle may be adjusted according to the following equation:

$$u(t) = Kp(e(t)) + Ki \int e(t)dt + Kd\frac{de(t)}{dt}$$

$$e(t) = S2 - S1$$

where u(t) is the front axle torque command, Kp is a proportional gain, e is a clutch speed error, Ki is integral gain, t is time, Kd is a derivative gain, S2 is a speed of an output side of a clutch, and S1 is a speed of an input side of a clutch.

The total wheel torque is unchanged and the front axle high gear clutch is open. The rear axle high gear clutch is open and the front axle low gear clutch is open. The rear axle low gear clutch is fully closed.

Between time t5 and time t6, the front axle high gear synchronizer is engaged (not shown) and the front axle electric machine torque is adjusted to reduce slip of the front axle high gear clutch. The torque of the rear axle electric machine is unchanged and the front axle high gear clutch is open. The rear axle high gear range clutch is fully open and the rear axle low gear range clutch is fully closed. The front axle low gear clutch is fully open.

At time t6, the front axle high gear clutch is fully closed and the front axle electric machine torque is increased at a predetermined rate (e.g., ramped up). The rear axle electric machine torque is decreased at a predetermined rate (e.g., ramped down). The front axle low gear clutch is fully open and the rear axle high gear clutch is fully open. The rear axle low gear clutch is fully closed and the total wheel torque is unchanged.

At time t7, the output torque of the rear axle electric machine is reduced to within a predetermined threshold of zero (e.g., 2 Nm) and the rear axle low gear clutch is fully opened. The front axle electric machine torque output has leveled off and the total wheel torque has remained constant. The rear axle high gear clutch remains fully open and the front axle high gear clutch remains fully closed to allow the front axle to solely propel the vehicle. The front axle low gear clutch remains fully open.

Between time t7 and time t8, the rear axle electric machine torque is not adjusted to allow gear teeth to mesh without causing a large impact between the gears, including gears in the final drive. The total wheel torque is unchanged and the rear axle high gear clutch remains open. The front axle high gear clutch is fully closed and the front axle low gear clutch is fully open. The rear axle low gear clutch is fully open.

At time t8, the rear axle electric machine is commanded to provide a negative torque (e.g., resisting driveline rotation) and the magnitude of the rear axle electric machine negative torque is ramped or increased at a predetermined rate to a desired negative value. The desired negative value allows the rear axle electric machine to control slip (e.g., a speed difference between a first side or an input side of a clutch and a second side or output side of the clutch) across the rear axle high gear clutch. The total wheel torque is unchanged and the front axle high gear clutch is fully closed. The rear axle high gear clutch is fully open and the front axle low gear clutch is open. The rear axle low gear clutch is fully open.

At time t9, the rear axle electric machine torque is held at a predetermined negative torque to allow the rear axle high gear clutch slip speed to be reduced so that rotational speed of rear axle electric machine may match the rotational speed of the high gear, thereby reducing slip speed of the rear axle high gear clutch. The torque output of the front axle electric machine remains at its previous level and the total wheel torque is unchanged. The front axle high gear clutch remains fully closed and the rear axle high gear clutch remains open. The front axle low gear clutch remains fully open and the rear axle low gear clutch remains fully open.

Between time t6 and time t10, the front and rear axle electric machines are operated in torque control mode.

At time t10, the rear axle electric machine is switched from operating in torque control mode to operating in speed control mode. In particular, the rear axle electric machine is commanded to reduce a slip speed of the high gear clutch to zero via a proportional/integral/derivative controller. The total wheel torque is unchanged and the front axle high gear clutch is fully closed. The rear axle high gear clutch is open and the front axle low gear clutch is open. The rear axle low gear clutch is fully open.

Between time t10 and time t11, the rear axle high gear synchronizer is engaged (not shown) and the rear axle electric machine torque is adjusted to reduce slip of the front axle high gear clutch. The torque of the front axle electric machine is unchanged and the front axle high gear clutch is fully closed. The rear axle high gear range clutch is fully closed and the rear axle low gear range clutch is fully open. The front axle low gear clutch is fully open.

At time t11, the rear axle high gear clutch is fully closed and the rear axle electric machine torque begins increasing at a predetermined rate (e.g., ramped up). The front axle electric machine torque begins decreasing at a predetermined rate (e.g., ramped down). The front axle low gear clutch is fully open and the front axle high gear clutch is fully closed. The rear axle low gear clutch is fully opened and the front axle low gear clutch is fully opened. The total wheel torque is unchanged.

At time t12, the front axle electric machine torque and the rear axle electric machine torque are equal and they provide the total wheel torque. The front axle high gear clutch is fully closed and the front axle low gear clutch is fully open. The rear axle high gear clutch is fully closed and the rear axle low gear clutch is fully open.

In this way, wheel torque of a vehicle may remain substantially constant (e.g., less than a 5% change in torque) while a driveline changes from a low gear range to a high gear range beginning with the front axle. Further, speeds of the electric machines may be closed loop controlled so that driveline torque disturbances may be low.

Referring now to FIG. 3, a second prophetic vehicle operating sequence according to the method of FIGS. 4 and 5 is shown. The vehicle operating sequence shown in FIG. 3 may be provided via the method of FIGS. 4 and 5 in cooperation with the system shown in FIG. 1. The plots shown in FIG. 3 occur at the same time and are aligned in time. The vertical lines at t20-t32 represent times of interest during the sequence. The sequence of FIG. 3 takes place when an accelerator pedal is not applied by a driver such that the wheel torque request is zero and while the vehicle is moving on a road.

The first plot from the top of FIG. 3 is a plot of electric machine torque versus time. The vertical axis represents electric machine torque and the electric machine torque increases in the direction of the vertical axis arrow. The horizontal axis represents time and time increases from the left side of the figure to the right side of the figure. Trace 304 represents the rear axle electric machine torque. Trace 302 represents the front axle electric machine torque.

The second plot from the top of FIG. 3 is a plot of total wheel torque (e.g., sum of front wheel torque and rear wheel torque) versus time. The vertical axis represents the total wheel torque at the vehicle's wheels and the magnitude of the total wheel torque increases in the direction of the vertical axis arrow. The horizontal axis represents time and time increases from the left side of the figure to the right side of the figure. Line 306 represents the total wheel torque.

The third plot from the top of FIG. 3 is a plot of front axle high gear clutch operating state versus time. The vertical axis represents front axle high gear clutch operating state and the front axle high gear clutch operating state is closed when a trace 308 is at a higher level near the vertical axis arrow. The horizontal axis represents time and time increases from the left side of the figure to the right side of the figure. Trace 308 represents the front axle high gear clutch state.

The fourth plot from the top of FIG. 3 is a plot of rear axle high gear clutch operating state versus time. The vertical axis represents rear axle high gear clutch operating state and the rear axle high gear clutch operating state is closed when a trace 310 is at a higher level near the vertical axis arrow. The horizontal axis represents time and time increases from the left side of the figure to the right side of the figure. Trace 310 represents the rear axle high gear clutch state.

The fifth plot from the top of FIG. 3 is a plot of front axle low gear clutch operating state versus time. The vertical axis represents front axle low gear clutch operating state and the front axle low gear clutch operating state is closed when a trace 312 is at a higher level near the vertical axis arrow. The horizontal axis represents time and time increases from the left side of the figure to the right side of the figure. Trace 312 represents the front axle low gear clutch state.

The sixth plot from the top of FIG. 3 is a plot of rear axle low gear clutch operating state versus time. The vertical axis represents rear axle low gear clutch operating state and the rear axle low gear clutch operating state is closed when a trace 314 is at a higher level near the vertical axis arrow. The horizontal axis represents time and time increases from the left side of the figure to the right side of the figure. Trace 314 represents the rear axle low gear clutch state.

At time t20, the front electric machine torque and the rear electric machine torque are positive, non-zero, and based on a non-zero or applied accelerator pedal position (not shown). The total wheel torque is at a middle level and the front axle and rear axle low gear clutches are fully closed. The front axle and rear axle high gear clutches are fully open. Thus, the driveline is in a low gear range suitable for driving the vehicle at lower speeds.

At time t21, a request to change the driveline from the lower gear range to a higher gear range occurs (not shown). The sequence shown begins by changing the gear ratio of the rear axle followed by changing the gear ratio of the front axle. The output torque of the rear electric machine begins to be reduced at a predetermined rate (e.g., ramped down) and the output of the front electric machine begins to be increased at a predetermined rate. This allows vehicle speed to be maintained and reduces the possibility of a generating a "torque hole" (e.g., a reduction in driveline torque that may reduce vehicle speed and may be noticeable to vehicle occupants) in driveline torque output. Thus, vehicle drivability may be improved and the rear axle may be shifted to high gear on the fly. The total wheel torque remains constant while the torque of the front and rear electric machines is changing. The rear axle low gear clutch begins to open and the front axle low gear clutch is fully closed. Thus, the low gear of the rear axle begins to be disengaged and the low gear of the front axle remains engaged so that driver demand torque may be delivered via the rear axle. The front axle high gear clutch and the rear axle high gear clutch are fully open so that electric machine torque is not transferred through the front axle higher gear and the rear axle higher gear.

At time t22, the output torque of the rear axle electric machine is reduced to within a predetermined threshold of zero (e.g., 2 Newton-meters) and the rear axle low gear clutch is fully opened. The front axle electric machine torque output has leveled off and the total wheel torque has remained constant. The front axle high gear clutch remains fully open and the rear axle high gear clutch remains fully open. The front axle low gear clutch remains fully closed to allow the rear axle electric machine to solely propel the vehicle.

Between time t22 and time t23, the rear axle electric machine torque is not adjusted to allow gear teeth to mesh without causing a large impact between the gears, including gears in the final drive. The total wheel torque is unchanged and the front axle high gear clutch remains open. The rear axle high gear clutch is also open and the front axle low gear clutch is fully closed. The rear axle low gear clutch is fully open.

At time t23, the rear axle electric machine is commanded to provide a negative torque (e.g., resisting driveline rotation) and the magnitude of the rear axle electric machine negative torque is ramped or increased at a predetermined rate to a desired negative value. The desired negative value allows the rear axle electric machine to control slip (e.g., a speed difference between a first side or an input side of a clutch and a second side or output side of the clutch) across the rear axle high gear clutch. The total wheel torque is unchanged and the front axle high gear clutch is open. The rear axle high gear clutch is open and the front axle low gear clutch is closed. The rear axle low gear clutch is open.

At time t24, the rear axle electric machine torque is held at a predetermined negative torque to allow the rear axle high gear clutch slip speed to be reduced so that rotational speed of rear axle electric machine may match the rotational speed of the high gear, thereby reducing slip speed of the rear axle high gear clutch. The torque output of the front axle electric machine remains at its previous level and the total wheel torque is unchanged. The front axle high gear clutch remains open and the rear axle high gear clutch remains open. The rear axle low gear clutch remains open and the front axle low gear clutch remains closed. Between time t20 and time t24, the front and rear axle electric machines are operated in torque control mode (e.g., the electric machine torque is adjusted to follow a torque while electric machine speed is permitted to vary) (not shown).

At time t25, the rear axle electric machine is switched from operating in torque control mode to operating in speed control mode (e.g., the electric machine torque is adjusted so that speed of the electric machine follows a speed while electric machine torque is permitted to vary) (not shown). In particular, the rear axle electric machine is commanded to reduce a slip speed of the rear high gear clutch to zero via a proportional/integral/derivative controller.

The total wheel torque is unchanged and the front axle high gear clutch is open. The rear axle high gear clutch is open and the front axle low gear clutch is closed. The rear axle low gear clutch is fully open.

Between time t25 and time t26, the rear axle high gear synchronizer is engaged (not shown) and the rear axle electric machine torque is adjusted to reduce slip of the rear axle high gear clutch. The torque of the front axle electric machine is unchanged and the rear axle high gear clutch is open. The front axle high gear range clutch is fully open and the front axle low gear range clutch is fully closed. The rear axle low gear clutch is fully open.

At time t26, the rear axle high gear clutch is fully closed and the rear axle electric machine torque is increased at a predetermined rate (e.g., ramped up). The front axle electric machine torque is decreased at a predetermined rate (e.g., ramped down). The rear axle low gear clutch is fully open and the front axle high gear clutch is fully open. The front axle low gear clutch is fully closed and the total wheel torque is unchanged.

At time t27, the output torque of the front axle electric machine is reduced to within a predetermined threshold of zero (e.g., 2 Newton-meters) and the front axle low gear clutch is fully opened. The rear axle electric machine torque output has leveled off and the total wheel torque has remained constant. The front axle high gear clutch remains fully open and the rear axle high gear clutch remains fully closed to allow the rear axle to solely propel the vehicle. The rear axle low gear clutch remains fully open.

Between time t27 and time t28, the front axle electric machine torque is not adjusted to allow gear teeth to mesh without causing a large impact between the gears, including gears in the final drive. The total wheel torque is unchanged and the front axle high gear clutch remains open. The rear axle high gear clutch is fully closed and the rear axle low gear clutch is fully open. The front axle low gear clutch is fully open.

At time t28, the front axle electric machine is commanded to provide a negative torque (e.g., apposing driveline rotation) and the magnitude of the front axle electric machine negative torque is ramped or increased at a predetermined rate to a desired negative value. The desired negative value allows the front axle electric machine to control slip (e.g., a speed difference between a first side or an input side of a clutch and a second side or output side of the clutch) across the front axle high gear clutch. The total wheel torque is unchanged and the rear axle high gear clutch is fully closed. The front axle high gear clutch is fully open and the rear axle low gear clutch is open. The front axle low gear clutch is fully open.

At time t29, the front axle electric machine torque is held at a predetermined negative torque to allow the front axle high gear clutch slip speed to be reduced so that rotational speed of front axle electric machine may match the rotational speed of the high gear, thereby reducing slip speed of the front axle high gear clutch. The torque output of the rear axle electric machine remains at its previous level and the total wheel torque is unchanged. The rear axle high gear clutch remains fully closed and the front axle high gear clutch remains open. The front axle low gear clutch remains fully open and the rear axle low gear clutch remains fully open.

Between time t26 and time t30, the front and rear axle electric machines are operated in torque control mode.

At time t30, the front axle electric machine is switched from operating in torque control mode to operating in speed control mode. In particular, the front axle electric machine is commanded to reduce a slip speed of the front high gear clutch to zero via a proportional/integral/derivative controller. The total wheel torque is unchanged and the rear axle high gear clutch is fully closed. The front axle high gear clutch is open and the front axle low gear clutch is open. The rear axle low gear clutch is fully open.

Between time t30 and time t31, the front axle high gear synchronizer is engaged (not shown) and the front axle electric machine torque is adjusted to reduce slip of the front axle high gear clutch. The torque of the rear axle electric machine is unchanged and the rear axle high gear clutch is fully closed. The front axle high gear range clutch is fully open and the rear axle low gear range clutch is fully open. The front axle low gear clutch is fully open.

At time t31, the front axle high gear clutch is fully closed and the front axle electric machine torque begins increasing at a predetermined rate (e.g., ramped up). The rear axle electric machine torque begins decreasing at a predetermined rate (e.g., ramped down). The front axle low gear clutch is fully open and the rear axle high gear clutch is fully closed. The rear axle low gear clutch is fully opened and the total wheel torque is unchanged.

At time t32, the front axle electric machine torque and the rear axle electric machine torque are equal and they provide the total wheel torque. The front axle high gear clutch is fully closed and the front axle low gear clutch is fully open. The rear axle high gear clutch is fully closed and the rear axle low gear clutch is fully open.

In this way, wheel torque of a vehicle may remain substantially constant (e.g., less than a 5% change in torque) while a driveline changes from a low gear range to a high gear range beginning with the rear axle. Further, speeds of the electric machines may be closed loop controlled so that driveline torque disturbances may be low.

Referring now to FIGS. 4 and 5, an example method for operating a vehicle that includes a first electric machine coupled to a front or first axle and a second electric machine coupled to a rear or second axle is shown. The method of FIGS. 4 and 5 may be incorporated into and may cooperate with the system of FIG. 1. Further, at least portions of the method of FIGS. 4 and 5 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to vehicle speed, accelerator pedal position, operating states of axle clutches, present wheel torque, and brake pedal position. Method 400 proceeds to 404.

At 404, method 400 judges if vehicle speed is greater than a threshold speed, accelerator pedal is greater than a threshold application amount, and a driveline shift from lower gear ratios of axles being engaged to higher gear ratios of the axles being engaged is requested. In one example, the threshold speed may be a speed that is greater than a predetermined speed (e.g., 60 kilometers/hour) and the threshold accelerator pedal application amount is a predetermined amount (e.g., less than 50% of full scale accelerator pedal position). A request to shift a driveline from lower gear ratios of axles to higher gear ratios of axles may be made via a vehicle operator and a human/machine interface. Alternatively, a request to request to shift the driveline from the lower gear ratios of axles to the higher gear ratios of the axles may be made automatically in response to vehicle operating conditions. For example, a request to shift a driveline from lower gear ratios of axles to higher gear ratios of axles may be made when vehicle speed is greater than a threshold speed. If method 400 judges that there is a request to shift a driveline from high gear ratios of axles to low gear ratios of axles, the answer is yes and method 400 proceeds to 406. Otherwise, the answer is no and method 400 proceeds to 450.

At 450, method 400 continues to operate the driveline with gears of axles engaged in their present configuration. For example, if method 400 judges that the driveline is operating with high gear ratios of axles engaged, the driveline continues to operate with high gear ratios of the axles engaged. Method 400 proceeds to exit.

At 406, method 400 judges if it is desired to shift the front axle from its lower gear ratio to its higher gear ratio before shifting the rear axle from its lower gear ratio to its higher gear ratio. Method 400 may judge to shift the front axle from its lower gear ratio to its higher gear ratio before shifting the rear axle from its lower gear ratio to its higher gear ratio based on road conditions, wheel slip, or other conditions. For example, if method 400 judges that wheel slip of the vehicle's rear wheels is present while wheel slip of front wheels is not present, then method 400 may judge to shift the front axle from its lower gear ratio to its higher gear ratio before shifting the rear axle from its lower gear ratio to its higher gear ratio so that a high level of traction may be maintained at the front axle. If method 400 judges that to shift the front axle from its lower gear ratio to its higher gear ratio before shifting the rear axle from its lower gear ratio to its higher gear ratio, the answer is yes and method 400 proceeds to 408. Otherwise, the answer is no and method 400 proceeds to 450.

At 408, while operating the front axle electric machine in a torque control mode, method 400 reduces torque output of a front axle electric machine to within a predetermined positive threshold torque of zero torque (e.g., 2 Newton-meters of zero torque) and increases torque output of a rear axle electric machine to meet driver demand torque and to maintain vehicle speed. The rear axle electric machine is operated in torque control mode. Thus, method 400 maintains vehicle wheel torque at a wheel torque that was present immediately before the request to shift the driveline from a lower gear ratio to a higher gear ratio. Such operation may be commanded when the accelerator pedal is applied and wheel torque is non-zero. Method 400 proceeds to 410.

At 410, method 400 disengages the front axle low gear clutch. The front axle low gear clutch is opened to allow the front axle high gear clutch to be fully closed. Method 400 proceeds to 412.

At 412, waits a predetermined amount of time (e.g., 300 milliseconds) to make torque adjustments to the front axle electric machine. Method 400 waits to allow a distance between gear teeth to be reduced so that impact between gear teeth may be reduced. Method 400 proceeds to 414.

At 414, method 400 requests a negative torque output from the front axle electric machine and increases the magnitude of the front axle electric machine negative torque so that the front axle electric machine outputs a small negative torque (e.g., −2 Nm). Method 400 proceeds to 416.

At 416, method 400 ramps or adjusts negative torque output of the front axle electric machine at a predetermined rate so that output of the front axle electric machine reaches a desired negative torque value (e.g., −10 Nm) for reducing speed of the front axle high speed clutch. Method 400 proceeds to 418.

At 418, method 400 changes the operating mode of the front axle electric machine from torque control mode to speed control mode. Method 400 adjusts torque of the front axle electric machine to reduce slip of the front axle high gear clutch (e.g., the clutch selectively allows torque transfer through the high gear) to zero.

Method 400 may increase a rotational speed of an output shaft of the front axle electric machine so that the rotational speed of the output shaft of the front axle electric machine is equal to a rotational speed of a low gear of the front axle. Once the rotational speed of the output shaft of the front axle electric machine is equal or nearly equal to the rotational speed of the low gear of the front axle, torque of the front axle electric machine is reduced. As previously mentioned, the front axle electric machine may be operated in a closed-loop speed control mode that utilizes a proportional/integral controller and that relies on speed feedback of the lower gear to drive a speed error between the rotational speed of the front axle electric machine and the speed of the front axle lower gear to zero. Method 400 proceeds to 420.

At 420, method 400 adjusts shift forks to engage a synchronizer of the high gear so that slip across the front axle high gear clutch may be further reduced. Method 400 proceeds to 422.

At 422, method 400 fully engages the front axle high gear when slip of the front axle high gear clutch is less than a threshold amount of slip. The front axle high gear may be engaged via the shift forks. Method 400 proceeds to 424.

At 424, method 400 reduces torque output of a rear axle electric machine at a predetermined rate to a small positive torque that is within a threshold of zero torque and increases torque output of a front axle electric machine at a predetermined rate to maintain vehicle speed via maintaining total wheel torque at the driver demand torque. The rear axle electric machine torque may be reduced toward zero in response to fully closing the high gear clutch of the front axle. Method 400 proceeds to 426.

At 426, method 400 disengages the rear axle low gear clutch. The rear axle low gear clutch is opened to allow the rear axle high gear clutch to be fully closed. Method 400 proceeds to 428.

At 428, waits a predetermined amount of time (e.g., 300 milliseconds) to make torque adjustments to the rear axle electric machine. Method 400 waits to allow a distance between gear teeth to be reduced so that impact between gear teeth may be reduced. Method 400 proceeds to 430.

At 430, method 400 requests a negative torque output from the rear axle electric machine and increases the magnitude of the rear axle electric machine negative torque so that the rear axle electric machine outputs a small negative torque (e.g., −2 Nm). Method 400 proceeds to 432.

At 432, method 400 ramps or adjusts negative torque output of the rear axle electric machine at a predetermined rate so that output of the rear axle electric machine reaches a desired negative torque value (e.g., −10 Nm) for reducing speed of the rear axle high speed clutch. Method 400 proceeds to 434.

At 434, method 400 changes the operating mode of the rear axle electric machine from torque control mode to speed control mode. Method 400 adjusts torque of the rear axle electric machine to reduce slip of the rear axle high gear clutch (e.g., the clutch selectively allows torque transfer through the high gear) to zero.

Method 400 may increase a rotational speed of an output shaft of the rear axle electric machine so that the rotational speed of the output shaft of the rear axle electric machine is equal to a rotational speed of a low gear of the rear axle. Once the rotational speed of the output shaft of the rear axle electric machine is equal or nearly equal to the rotational speed of the low gear of the rear axle, torque of the rear axle electric machine is reduced. As previously mentioned, the rear axle electric machine may be operated in a closed-loop speed control mode that utilizes a proportional/integral controller and that relies on speed feedback of the lower gear to drive a speed error between the rotational speed of the rear axle electric machine and the speed of the rear axle lower gear to zero. Method 400 proceeds to 436.

At 436, method 400 adjusts shift forks to engage a synchronizer of the rear axle high gear so that slip across the rear axle high gear clutch may be further reduced. Method 400 proceeds to 438.

At 438, method 400 fully engages the rear axle high gear when slip of the rear axle high gear clutch is less than a threshold amount of slip. The rear axle high gear may be engaged via the shift forks. Method 400 proceeds to 440.

At 440, method 400 reduces torque output of the front axle electric machine and increases torque output of the rear axle electric machine until output torques of the front axle electric machine and rear axle electric machine are equal. Further, the front axle electric machine and the rear axle electric machine provide the driver demand wheel torque. Method 400 proceeds to exit.

At 450, while operating the rear axle electric machine in a torque control mode, method 400 reduces torque output of a rear axle electric machine to within a predetermined positive threshold torque of zero torque (e.g., 2 Newton-meters of zero torque) and increases torque output of a front axle electric machine to meet driver demand torque and to maintain vehicle speed. The front axle electric machine is operated in torque control mode. Thus, method 400 maintains vehicle wheel torque at a wheel torque that was present immediately before the request to shift the driveline from a lower gear ratio to a higher gear ratio. Such operation may be commanded when the accelerator pedal is applied and wheel torque is non-zero. Method 400 proceeds to 452.

At 452, method 400 disengages the rear axle low gear clutch. The rear axle low gear clutch is opened to allow the rear axle high gear clutch to be fully closed. Method 400 proceeds to 454.

At 454, waits a predetermined amount of time (e.g., 300 milliseconds) to make torque adjustments to the rear axle electric machine. Method 400 waits to allow a distance between gear teeth to be reduced so that impact between gear teeth may be reduced. Method 400 proceeds to 456.

At 456, method 400 requests a negative torque output from the rear axle electric machine and increases the magnitude of the rear axle electric machine negative torque so that the rear axle electric machine outputs a small negative torque (e.g., −2 Nm). Method 400 proceeds to 458.

At 458, method 400 ramps or adjusts negative torque output of the rear axle electric machine at a predetermined rate so that output of the rear axle electric machine reaches a desired negative torque value (e.g., −10 Nm) for reducing speed of the rear axle high speed clutch. Method 400 proceeds to 460.

At 460, method 400 changes the operating mode of the rear axle electric machine from torque control mode to speed control mode. Method 400 adjusts torque of the rear axle electric machine to reduce slip of the rear axle high gear clutch (e.g., the clutch selectively allows torque transfer through the high gear) to zero.

Method 400 may increase a rotational speed of an output shaft of the rear axle electric machine so that the rotational speed of the output shaft of the rear axle electric machine is equal to a rotational speed of a low gear of the rear axle. Once the rotational speed of the output shaft of the rear axle electric machine is equal or nearly equal to the rotational speed of the low gear of the rear axle, torque of the rear axle electric machine is reduced. As previously mentioned, the rear axle electric machine may be operated in a closed-loop speed control mode that utilizes a proportional/integral controller and that relies on speed feedback of the lower gear to drive a speed error between the rotational speed of the rear axle electric machine and the speed of the rear axle lower gear to zero. Method 400 proceeds to 462.

At 462, method 400 adjusts shift forks to engage a synchronizer of the high gear so that slip across the rear axle high gear clutch may be further reduced. Method 400 proceeds to 464.

At 464, method 400 fully engages the rear axle high gear when slip of the rear axle high gear clutch is less than a threshold amount of slip. The rear axle high gear may be engaged via the shift forks. Method 400 proceeds to 466.

At 466, method 400 reduces torque output of a front axle electric machine at a predetermined rate to a small positive torque that is within a threshold of zero torque and increases torque output of a rear axle electric machine at a predetermined rate to maintain vehicle speed via maintaining total wheel torque at the driver demand torque. The front axle electric machine torque may be reduced toward zero in response to fully closing the high gear clutch of the rear axle. Method 400 proceeds to 468.

At 468, method 400 disengages the front axle low gear clutch. The front axle low gear clutch is opened to allow the front axle high gear clutch to be fully closed. Method 400 proceeds to 470.

At 470, waits a predetermined amount of time (e.g., 300 milliseconds) to make torque adjustments to the front axle electric machine. Method 400 waits to allow a distance between gear teeth to be reduced so that impact between gear teeth may be reduced. Method 400 proceeds to 472.

At 472, method 400 requests a negative torque output from the front axle electric machine and increases the magnitude of the front axle electric machine negative torque so that the front axle electric machine outputs a small negative torque (e.g., −2 Nm). Method 400 proceeds to 474.

At 474, method 400 ramps or adjusts negative torque output of the front axle electric machine at a predetermined rate so that output of the front axle electric machine reaches a desired negative torque value (e.g., −10 Nm) for reducing speed of the front axle high speed clutch. Method 400 proceeds to 476.

At 476, method 400 changes the operating mode of the front axle electric machine from torque control mode to speed control mode. Method 400 adjusts torque of the front axle electric machine to reduce slip of the front axle high gear clutch (e.g., the clutch selectively allows torque transfer through the high gear) to zero.

Method 400 may increase a rotational speed of an output shaft of the front axle electric machine so that the rotational speed of the output shaft of the front axle electric machine is equal to a rotational speed of a low gear of the front axle. Once the rotational speed of the output shaft of the front axle electric machine is equal or nearly equal to the rotational speed of the low gear of the front axle, torque of the front axle electric machine is reduced. As previously mentioned, the front axle electric machine may be operated in a closed-loop speed control mode that utilizes a proportional/integral controller and that relies on speed feedback of the lower gear to drive a speed error between the rotational speed of the front axle electric machine and the speed of the front axle lower gear to zero. Method 400 proceeds to 478.

At 478, method 400 adjusts shift forks to engage a synchronizer of the front axle high gear so that slip across the front axle high gear clutch may be further reduced. Method 400 proceeds to 480.

At 480, method 400 fully engages the front axle high gear when slip of the front axle high gear clutch is less than a threshold amount of slip. The front axle high gear may be engaged via the shift forks. Method 400 proceeds to 482.

At 482, method 400 reduces torque output of the front axle electric machine and increases torque output of the rear axle electric machine until output torques of the front axle electric machine and rear axle electric machine are equal. Further, the front axle electric machine and the rear axle electric machine provide the driver demand wheel torque. Method 400 proceeds to exit.

Thus, the method of FIGS. 4 and 5 may shift from a lower gear of the rear axle into a higher gear of the rear axle before shifting the lower gear of the front axle to the higher gear of the front axle. Alternatively, the method of FIGS. 4 and 5 may shift the lower gear of the front axle into a higher gear of the front axle before shifting the lower gear of the rear axle to the higher gear of the rear axle. Further, the method of FIGS. 4 and 5 may be performed when driver demand is non-zero and while the vehicle is moving. Vehicle operators may find such driveline gear changing to be efficient and time saving.

The method of FIGS. 4 and 5 provide for a method for operating a vehicle, comprising: shifting a first axle from a low gear range to a high gear range while meeting driver demand torque via a second axle, the shifting including ramping down torque of an electric machine of the first axle to first threshold positive torque, disengaging the low gear range, adjusting torque of the electric machine of the first axle to a negative torque in a predetermined amount of time after the electric machine of the first axle reaches the first threshold positive torque, the torque of the electric machine of the first axle adjusting a high gear range clutch's slip speed of the first axle, engaging a synchronizer in response to the high gear range clutch's slip is within a threshold of zero slip, closing the high gear range clutch, and increasing torque of the electric machine after closing the high gear range clutch. The method includes where the first axle is a front axle. The method further comprises shifting a rear axle from a rear axle low gear range to a rear axle high gear range while meeting driver demand torque via the front axle, the shifting of the rear axle including ramping down torque of an electric machine of the rear axle to a second threshold positive torque, disengaging the rear axle low gear range, adjusting torque of the electric machine of the rear axle to a negative torque in a second predetermined amount of time after the electric machine of the rear axle reaches the second threshold positive torque, the torque of the electric machine of the rear axle adjusting a rear axle high gear range clutch's slip speed, engaging a rear axle synchronizer in response to the rear axle high gear range clutch's slip is within a threshold of zero slip, closing the rear axle high gear range clutch, and increasing torque of the electric machine of the rear axle after closing the rear axle high gear range clutch. The method includes where the first axle is a rear axle.

In some examples, the method further comprises shifting a front axle from a front axle low gear range to a front axle high gear range while meeting driver demand torque via the rear axle, the shifting of the front axle including ramping down torque of an electric machine of the front axle to zero torque, disengaging the front axle low gear range, adjusting torque of the electric machine of the front axle to a negative torque in a second predetermined amount of time, the torque of the electric machine of the front axle adjusting a front axle high gear range clutch's slip speed, engaging a front axle synchronizer in response to the front axle high gear range clutch's slip is within a threshold of zero slip, closing the front axle high gear range clutch, and increasing torque of the electric machine of the front axle after closing the front axle high gear range clutch. The method includes where meeting driver demand torque includes increasing torque of an electric machine of the second axle. The method includes where the first axle includes a total of two gear ranges.

The method of FIGS. 4 and 5 also provides for a method for operating a vehicle, comprising: shifting a first axle from a low gear range to a high gear range while generating a driver demand torque via a second axle, the shifting including ramping down torque of an electric machine of the first axle to a first threshold positive torque, disengaging the low gear range, adjusting torque of the electric machine of the first axle to a negative torque in a predetermined amount of time after the electric machine of the first axle reaches the first threshold positive torque, operating the electric machine of the first axle in a speed control mode in response to reaching the negative torque or a slip amount of a clutch of the first axle being less than a threshold, engaging a synchronizer in response to the slip amount is within a threshold of zero slip, closing the clutch, and increasing torque of the electric machine of the first axle after closing the clutch of the first axle. The method includes where the clutch is a high gear range clutch.

In some examples, the method further comprises adjusting the speed of the electric machine of the first axle while operating the electric machine of the first axle in the speed control mode to a speed that reduces the slip amount of the clutch of the first axle. The method further comprises shifting a second axle from a low gear range of the second axle to a high gear range of the second axle while meeting driver demand torque via the first axle, the shifting including ramping down torque of an electric machine of the second axle to second threshold positive torque, disengaging the low gear range of the second axle, adjusting torque of the electric machine of the second axle to a negative torque in a predetermined amount of time after the electric machine of the second axle reaches the second threshold positive torque, operating the electric machine of the second axle in a speed control mode in response to reaching the negative torque or a slip amount of a clutch of the second axle being less than a threshold, engaging a synchronizer of the second axle in response to the slip amount of the clutch of the second axle is within a threshold of zero slip, closing the clutch of the second axle, and increasing torque of the electric machine of the second axle after closing the clutch of the second axle. The method further comprises operating an electric machine of the second axle in a torque control mode. The method includes where the electric machine of the second axle generates the driver demand torque. The method includes where the low gear range is disengaged via opening a low gear range clutch.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
shifting a first axle from a low gear range to a high gear range while meeting driver demand torque via a second axle, the shifting including ramping down torque of an electric machine of the first axle to first threshold positive torque, disengaging the low gear range, adjusting torque of the electric machine of the first axle to a negative torque in a predetermined amount of time after the electric machine of the first axle reaches the first threshold positive torque, the torque of the electric machine of the first axle adjusting a high gear range clutch's slip speed of the first axle, engaging a synchronizer in response to the high gear range clutch's slip is within a threshold of zero slip, closing the high gear range clutch, and increasing torque of the electric machine after closing the high gear range clutch.

2. The method of claim 1, where the first axle is a front axle.

3. The method of claim 2, further comprising shifting a rear axle from a rear axle low gear range to a rear axle high gear range while meeting driver demand torque via the front axle, the shifting of the rear axle including ramping down torque of an electric machine of the rear axle to a second threshold positive torque, disengaging the rear axle low gear range, adjusting torque of the electric machine of the rear axle to a negative torque in a second predetermined amount of time after the electric machine of the rear axle reaches the second threshold positive torque, the torque of the electric machine of the rear axle adjusting a rear axle high gear range clutch's slip speed, engaging a rear axle synchronizer in response to the rear axle high gear range clutch's slip is within a threshold of zero slip, closing the rear axle high gear range clutch, and increasing torque of the electric machine of the rear axle after closing the rear axle high gear range clutch.

4. The method of claim 1, where the first axle is a rear axle.

5. The method of claim 4, further comprising shifting a front axle from a front axle low gear range to a front axle high gear range while meeting driver demand torque via the rear axle, the shifting of the front axle including ramping down torque of an electric machine of the front axle to zero torque, disengaging the front axle low gear range, adjusting torque of the electric machine of the front axle to a negative torque in a second predetermined amount of time, the torque of the electric machine of the front axle adjusting a front axle high gear range clutch's slip speed, engaging a front axle synchronizer in response to the front axle high gear range clutch's slip is within a threshold of zero slip, closing the front axle high gear range clutch, and increasing torque of the electric machine of the front axle after closing the front axle high gear range clutch.

6. The method of claim 1, where meeting driver demand torque includes increasing torque of an electric machine of the second axle.

7. The method of claim 1, where the first axle includes a total of two gear ranges.

8. A vehicle system, comprising:
a first electric machine coupled to a front axle, the front axle including a first gearbox including a first gear and a second gear;
a second electric machine coupled to a rear axle, the rear axle including a second gearbox including a third gear and a fourth gear;
a controller including executable instructions stored in non-transitory memory to decrease output of the first electric machine to a negative torque and increase output of the second electric machine in response to a request to switch a driveline from a lower gear range to a higher gear range.

9. The system of claim 8, further comprising additional instructions to operate the first electric machine in a speed control mode during a shift from the lower gear range to the higher gear range.

10. The system of claim 9, further comprising additional instructions to reduce slip of a clutch while operating the first electric machine in the speed control mode.

11. The system of claim 10, where the first electric machine is operated in the speed control mode in response to output of the first electric machine reaching the negative torque.

12. The system of claim 8, further comprising additional instructions to provide a driver demand torque via the second electric machine.

13. The system of claim 8, further comprising operating the second electric machine in a torque control mode.

14. A method for operating a vehicle, comprising:
shifting a first axle from a low gear range to a high gear range while generating a driver demand torque via a second axle, the shifting including ramping down torque of an electric machine of the first axle to a first threshold positive torque, disengaging the low gear range, adjusting torque of the electric machine of the first axle to a negative torque in a predetermined amount of time after the electric machine of the first axle reaches the first threshold positive torque, operating the electric machine of the first axle in a speed control mode in response to reaching the negative torque or a slip amount of a clutch of the first axle being less than a threshold, engaging a synchronizer in response to the slip amount is within a threshold of zero slip, closing the clutch, and increasing torque of the electric machine of the first axle after closing the clutch of the first axle.

15. The method of claim 14, where the clutch is a high gear range clutch.

16. The method of claim 14, further comprising adjusting the speed of the electric machine of the first axle while operating the electric machine of the first axle in the speed control mode to a speed that reduces the slip amount of the clutch of the first axle.

17. The method of claim 14, further comprising shifting a second axle from a low gear range of the second axle to a high gear range of the second axle while meeting driver demand torque via the first axle, the shifting including ramping down torque of an electric machine of the second axle to second threshold positive torque, disengaging the low gear range of the second axle, adjusting torque of the electric machine of the second axle to a negative torque in a predetermined amount of time after the electric machine of the second axle reaches the second threshold positive torque, operating the electric machine of the second axle in a speed control mode in response to reaching the negative torque or a slip amount of a clutch of the second axle being less than a threshold, engaging a synchronizer of the second axle in response to the slip amount of the clutch of the second axle is within a threshold of zero slip, closing the clutch of the second axle, and increasing torque of the electric machine of the second axle after closing the clutch of the second axle.

18. The method of claim 14, further comprising operating an electric machine of the second axle in a torque control mode.

19. The method of claim 18, where the electric machine of the second axle generates the driver demand torque.

20. The method of claim 14, where the low gear range is disengaged via opening a low gear range clutch.

* * * * *